United States Patent [19]

Hong et al.

[11] Patent Number: 5,054,075
[45] Date of Patent: Oct. 1, 1991

[54] SUBBAND DECODING METHOD AND APPARATUS

[75] Inventors: Daehyoung Hong, Hanover Park; Michael D. Kotzin, Buffalo Grove, both of Ill.

[73] Assignee: Motorola, Inc., Schaumburg, Ill.

[21] Appl. No.: 403,245

[22] Filed: Sep. 5, 1989

[51] Int. Cl.$^5$ .............................................. G10L 7/02
[52] U.S. Cl. ..................................................... 381/36
[58] Field of Search .................................. 381/31–41, 381/29, 30, 46, 47, 51

[56] References Cited

U.S. PATENT DOCUMENTS

| | | | |
|---|---|---|---|
| 4,220,819 | 9/1980 | Atal | 179/1 |
| 4,669,120 | 5/1987 | Ono | 381/40 |
| 4,701,955 | 10/1987 | Taguchi | 381/51 |
| 4,703,480 | 10/1987 | Westall et al. | 381/30 |
| 4,716,592 | 12/1987 | Ozawa et al. | 381/40 |
| 4,805,193 | 2/1989 | McLaughlin et al. | 381/29 |
| 4,811,398 | 3/1989 | Copperi et al. | 381/37 |
| 4,853,963 | 8/1989 | Bloy et al. | 381/31 |
| 4,896,362 | 1/1990 | Veldhuis et al. | 381/41 |
| 4,933,957 | 6/1990 | Bottau et al. | 381/29 |
| 4,975,958 | 12/1990 | Hanada et al. | 381/35 |

Primary Examiner—Emanuel S. Kemeny
Assistant Examiner—Michelle Doerrler
Attorney, Agent, or Firm—Wayne J. Egan

[57] ABSTRACT

An subband coding system encoder is provided for improving the quality of a reconstructed speech signal. Briefly, the improved subband coding system encoder includes means for improving the selection of the waveform/noise fill gain factor. The improved selection method, according to the invention, is based on the quasi-stationary characteristic of speech, that is, that the short-time frequency spectrum of a speech signal varies slowly with time. Moreover, the amount of fill energy is adaptively determined for each subband according to the shape of the frequency spectrum for each speech frame.

15 Claims, 3 Drawing Sheets

SUBBAND DECODING METHOD AND APPARATUS

TECHNICAL FIELD

This application relates generally to voice coders and more particularly to a method for improving the quality of a reconstructed voice signal.

BACKGROUND OF THE INVENTION

When speech is processed to achieve a low bit rate (or occupy a smaller bandwidth), improved spectrum or storage efficiency can be obtained. However, this causes the quality of the processed speech signal to be degraded. As a result, maintaining speech quality while minimizing bit rate or occupied bandwidth is a key issue for the success of any speech coding scheme.

In the past, low bit-rate voice coders have been used to reduce the amount of information required for transmission or storage. One such voice coder is a digital sub-band coder, which operates on speech segments to partition a voice signal into multiple frequency subbands. Based on the signal's spectral energy distribution, digital bits are allocated among certain subbands to encode the subband's information for transmission or storage.

In subband-type processing, a time segment (frame) of speech is processed. The speech segment is divided into subband signals by a filter bank. Each subband signal is processed according to the frequency spectrum of the input speech. For example, typical digital subband coding (SBC) allocates available bits to encode subband information according to the computed subband energy distribution. More bits are allocated for subbands with higher energy to yield an improved reconstructed output for these more significant bands. Fewer bits (or even zero bits) are allocated for subbands with lower energy. Another example is multilevel subband coding (MSBC) which provides for speech samples for only a fixed number of subbands. The rest of the subband signals are not transmitted. For better spectrum efficiency, very few subband signals are transmitted. In the aforementioned decoders, the quality of reconstructed speech is degraded due to those coarsely-quantized and/or missing subband signals.

Applied in a radio frequency communication system, it is desired to send only the essential spectral information to the receiver, which then reconstructs or synthesizes the voice signal by routing the essential signal information to reconstruction subband filters. In an attempt to improve the quality of the reconstructed signal, earlier sub-band coders have utilized random noise to excite those subband reconstruction filters for which actual signal information is unavailable. The filtered noise signals are then combined with the outputs from those subband filters excited with known information to generate a more natural-sounding voice signal. The amount of noise added in each spectral subband is usually scaled in proportion to the amount of speech energy originally present in the corresponding frequency subband. See, for example, Tor A. Ramstad, "Subband Coder with a Simple Adaptive Bit Allocation Algorithm—A Possible Candidate for Digital Mobile Telephony?", Proc. ICASSP, pp. 203-207, May 1982.

The amount of waveform/noise fill energy introduced into subbands where samples are not sent has traditionally been a fixed fraction of the actual speech energy present in those respective subbands. The fraction is empirically determined using subjective listening tests. A trade-off exists in the selection, however. This is because higher amplitudes of energy fill better mask artifacts and eliminate hollowness, whereas excess added waveform/noise causes coarseness and granularity.

SUMMARY OF THE INVENTION

Accordingly, it is an object of the invention to provide an improved method for improving the quality of a reconstructed speech signal. Briefly, an improved SBC encoder is provided having a means to improve the selection of the waveform/noise fill gain factors. The improved selection method, according to the invention, is based on the quasi-stationary characteristic of speech, to wit, that the short-time frequency spectrum of a speech signal varies slowly with time. Moreover, the amount of fill energy is adaptively determined for each subband according to the shape of the frequency spectrum for each speech frame.

DETAILED DESCRIPTION OF THE INVENTION

Figure 1:
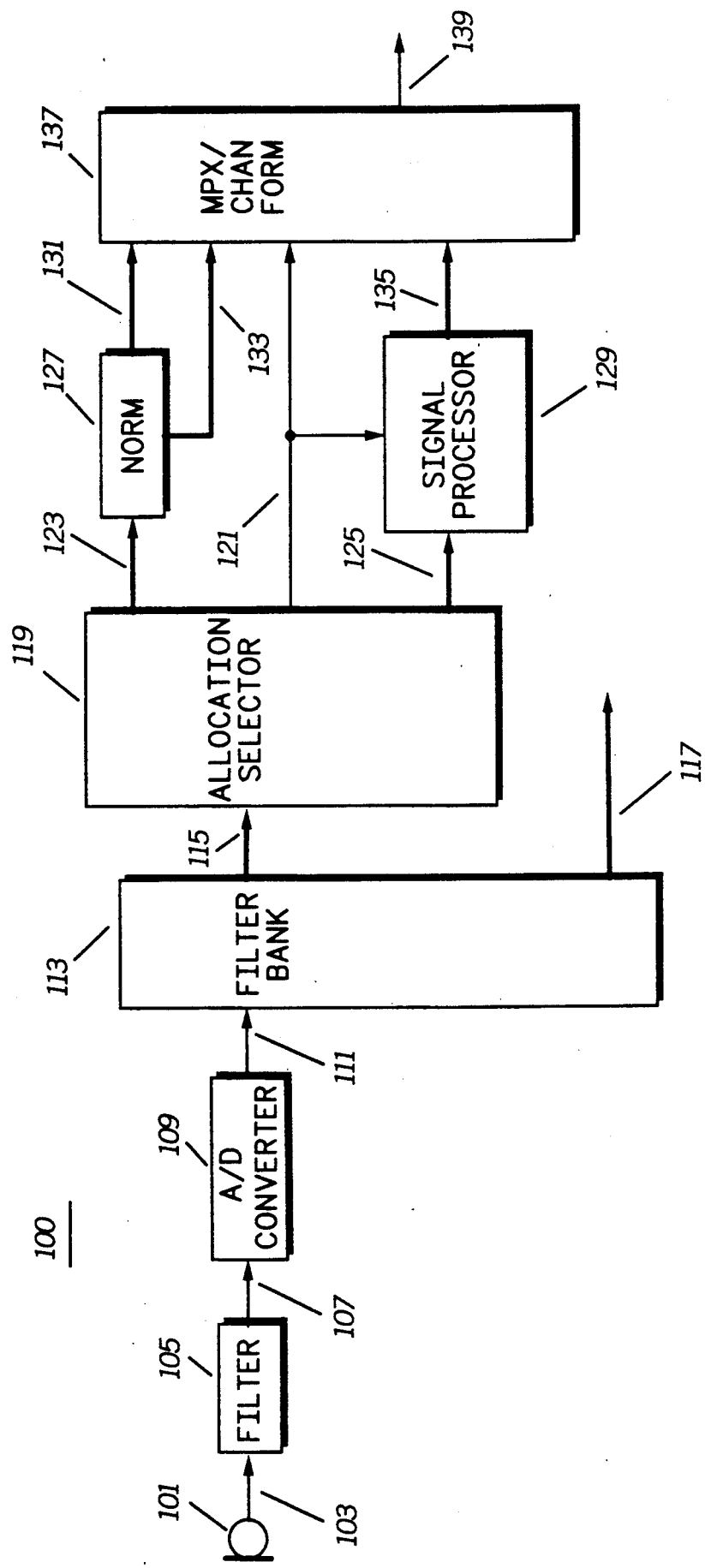
FIG. 1 is a block diagram that shows a first embodiment of an improved SBC encoder, according to the invention.

Referring now to FIG. 1, there is shown a block diagram of subband encoder 100 utilizing the signal processing technique according to the present invention. An acoustic input signal to be transmitted is applied at microphone 101. The input signal 103 is then applied to filter 105, which is generally a bandpass-type. The filtered signal 107 is then represented by a digital code in analog-to-digital (A/D) converter 109, as known in the art. The sampling rate is 8.0 KHz in the preferred embodiment. The digital output of A/D 111, which may be represented as input speech sequence s(j), is then applied to a filter bank 113. This input sequence s(j) is repetitively obtained in separate frames, i.e. block of times. In the preferred embodiment, input speech sequence s(j), $1 \leq j \leq J$, represents a 30 msec frame containing J=240 samples. For each block of speech, frequency spectrum components are separated for each subband and a set of K subband sample sequences $v_k(m)$, where k is an index indicating the k-th subband, wherein $1 \leq k \leq K$, each comprised of M samples, wherein $1 \leq m \leq M$, is produced in accordance with prior art techniques by filter bank 113. In the preferred embodiment, filter bank 113 is comprised of K=16 bandpass subband filters of 250 Hz bandwidth each. Due to the bandwidth reduction by 16, the filter bank outputs may likewise be decimated by 16 such that each subband sample sequence $v_k(m)$ contains M=15 samples. See, for example, "Quadrature Mirror Filter Design for an Arbitrary Number of Equal Bandwidth Channels" *IEEE Trans. Acoustics, Speech, and Signal Processing.* Vol. ASSP-33, pp. 203-18, Feb. 1985, by P. L. Chu, for representative methods of subband filtering. Subband samples 115 out of a subset of subband filters are considered for further processing, while other subband samples 117 are discarded. In the preferred embodiment, only subband samples out of subband k, $2 \leq k \leq 12$, are preserved, which correspond to a frequency band between 250 Hz and 3000 Hz.

Allocation selector 119 computes the subband energy $E_k$ according to the equation:

$$E_k = 10 \cdot \log \sum_{m=1}^{M} [v_k(m)]^2 \, (dB) \quad \{1\}$$

and select L subbands which have largest energy value. In the preferred embodiment, L=4 subbands are allocated. The allocation vector 121 is applied to multiplexer/channel formatter 137 and sent over the channel for use by the SBC decoder for speech synthesis. The allocation vector 121, indicating selected subbands, is also applied to signal processor 129, the function of which will be discussed below. The samples of allocated subbands 123 are normalized by the normalizer 127, which scale(normalize) M samples of each subband to reside within some maximum amplitude range. Preferably, maximum amplitude is ±127. The normalized samples 131 and scaling(normalization) factors 133 of those allocated subbands are applied to multiplexer 137 and sent over the channel.

All subband energy values $E_k$ 125 computed at allocation selector 119 and the allocation vector 121 are now applied to the signal processor 129 to generate a set of adaptively modified subband energy values $E'_k$ 135 for unallocated subbands according to the technique, which will subsequently be described with FIG. 3. The modified subband energy values $E'_k$ 135 are applied to the multiplexer 137 and sent over the channel 139.

Before preceding with the detailed description of the operation of the SBC decoder 200, it may prove helpful to provide an explanation to the signal processing technique of signal processor 129 taken by the present invention. For each segment of speech, the energy value of the subband signal $E_k$(dB) 125 is adaptively modified for all the subbands. The amount of energy value modification for each subband is decided according to the variation of the energy values, as follows:

First, the spectral-tilt is estimated by obtaining a first order function, $$Y_k = Ak + B$$

as a function of the subband index k. The coefficients A and B are determined to minimize the sum of the square errors between the subband energy $E_k$ and the approximation $Y_k$. The variation of the energy value for the subband k is now indicated with the difference value $Z_k = E_k - Y_k$. The largest difference value $Z_{k|max}$ is obtained to be used as a reference value for the speech frame. The amount of subband energy attenuation is proportional to $Z_{k|max} - Z_k$ for the k-th subband. Finally, the adjusted energy value $E'_k$ is obtained as follows:

$$E'_k = E_k - \xi(Z_{k|max} - Z_k).$$

The value $E'_k$ is transmitted to the receiver and is used in the decoder for the reconstruction of the speech signal. The amount of energy value modification is decided by an adjusting factor $\xi$. The best value of $\xi$ is obtain from subjective listening tests, preferably $\xi = 0.3$.

When the frequency spectrum is flat or the variation of energy value is small, the absolute magnitude values of $Z_k$'s are small. This typically corresponds to the unvoiced or quiet segments of speech. More energy is filled into the subbands in these cases. For the voiced segments of speech, energy is more concentrated in a very few subbands. For these cases, less energy is filled to the unallocated subbands since they would correspond to spectral valleys.

By using this method, the processed speech sounds crisper and background rumbling generated from input noise of known art is removed. The improvement is very substantial when the noise level with the input speech is audibly high. Spectrum efficiency is preserved since no extra information is required to be transmitted. There are, of course, numerous ways of implementing this approach to provide varying degrees of effectiveness in improving the perceptual quality of the received speech signal. For example, a "whiteness measure" can be computed that is the ratio of energies summed for subbands whose samples are not selected for transmission to the total speech energy of the subframe. The amount of waveform fill is then functionally related to this whiteness measure. For flat spectra, the whiteness measure will be higher and proportionally more fill energy should be used. For low whiteness situations typically corresponding to voiced speech, less waveform/noise fill is required.

Figure 2:
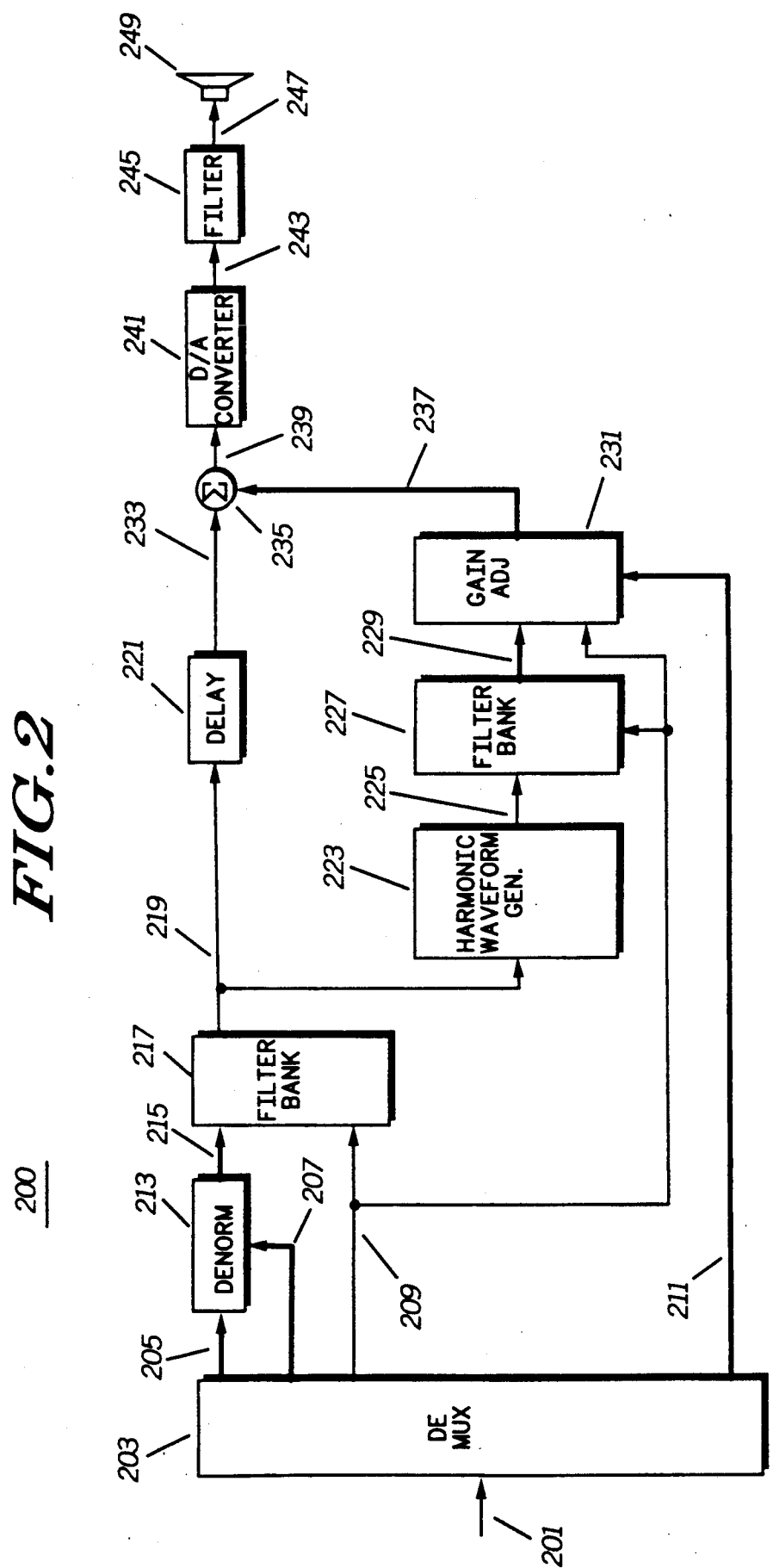
FIG. 2 is a general block diagram of a SBC decoder for speech synthesis using the present invention.

Turning now to FIG. 2, there is a block diagram of a subband coding (SBC) speech decoder 200 using the present invention. Decoder 200 obtains allocated subband samples 205, normalization factors of the allocated subbands 207, allocation vectors 209, and adaptively modified energy values 211, from the channel 201 via de-multiplexer/channel de-formatter 203. Denormalizer 213 scale subband samples 205 by the inverse of normalization factor 207 to generate the subband samples 215 for those allocated filters in each frame of speech. These subband samples 215 are inserted into corresponding subbands of filter bank 217 according to allocation vector 209 to generate a partially synthesized speech waveform 219. This waveform has frequency component only for the frequency band of allocated subbands. Harmonic waveform generator 223 processes the waveform 219 and produces a waveform 225 which has the frequency component of all subbands by a processing method as known in the art, preferably by full-wave rectification. The generated waveform 225 is divided into subbands by filter bank 227 and the subband samples 229 corresponding to the unallocated subbands are produced. Samples for each subband are scaled to have an energy value which is the same as the received modified subband energy values $E'_k$ 211 by gain adjustment block 231. The gain-adjustment block 231 computes the gain factor of each subband input signal 229 so that the subband signal 237 has the energy value of $E'_k$ respectively. It will be appreciated that if random noise is used as a fill signal instead of a harmonically-related signal, the gain factor controlling the amplitude of the added noise will be related to $E'_k$. The scaled subband samples 237 are applied to the summer 235. On the other hand the partially synthesized speech waveform samples 219 is delayed by the delay block 221, preferably a memory buffer, to compensate the processing delay through blocks 223, 227, and 231. The delayed waveform samples 233 is now applied to the summer 235 and summed with the scaled subband samples 237 to generate the waveform samples 239 which has frequency components for the allocated as well as unallocated subbands. These samples, which represent a frame of reconstructed speech, is then applied to digital-to-analog (D/A) converter 241 to produce a reconstructed analog signal 243, which is then low pass filtered to reduce aliasing by filter 245. The low-pass filtered signal 247 is applied to an output transducer such as speaker 249.

Figure 3:
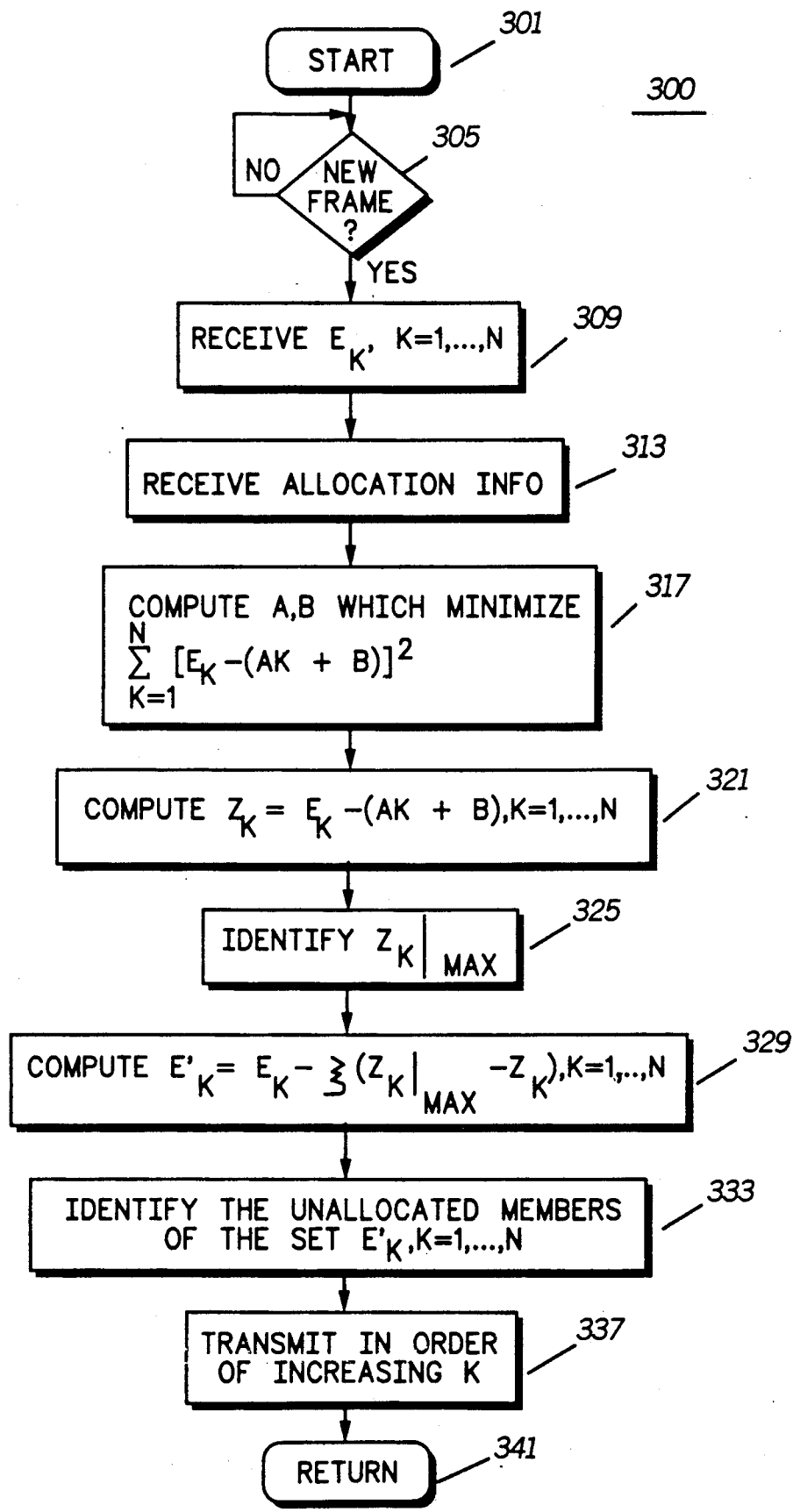
FIG. 3 is a flow diagram for the first embodiment.

Turning now to FIG. 3, there is shown a flow diagram 300 of the first embodiment. The process starts at step 301, and then proceeds to wait for a new frame, step 305. Upon determining that it is time for a new frame (step 305), the process goes to step 309. Here it receives N energy values $E_k$ from the allocation selector 119, where k varies from 1−N. These N received values are depicted in FIG. 1 as element 125. In the preferred embodiment, N=11.

The process next receives the allocation vector 121 from the selector 119, step 313.

The process next goes to step 317. Here it computes the values A, B which minimize the value:

$$\sum_{k=1}^{N} [E_k - (Ak + B)]^2.$$

The process next goes to step 321. Here it computes N values $Z_k$, where k varies from 1−N, by the following calculation:

$$Z_k = E_k - (Ak + B).$$

The process next goes to step 325, where it selects the largest member of the set of N $Z_k$'s, which is designated $Z_k|_{max}$.

The process next goes to step 329. Here it computes N values $E'_k$, where k varies from 1−N, by the following calculation:

$$E'_k = E_k - \xi(Z_k|_{max} - Z_k).$$

The process next goes to step 333. Here, based on the allocation information 121, it identifies the L unallocated members of the set of $E'_k$'s. In the preferred embodiment, L=7. These L values are then transmitted in order of increasing k, step 337. These L transmitted values are depicted in FIG. 1 as element 135. The process then returns, step 341.

It will be appreciated by one skilled in the art that the flow diagram 300 of the first embodiment may be implemented by any convenient computing means such as, for example, a suitably-programmed computer or microprocessor. In the preferred embodiment, the computing means selected is a digital signal processor (DSP) such as, for example, the DSP56001 available from Motorola, Inc., 1301 East Algonquin Road, Schaumburg, Ill. 60196.

While various embodiments of an improved SBC encoder, according to the present invention, have been described hereinabove, the scope of the invention is defined by the following claims.

What is claimed is:

1. In a subband coding system including an encoder having an input signal and a decoder, a method for providing an improved reconstructed signal at the decoder, comprising the following steps:
   (a) providing a partially reconstructed signal based on information received from the encoder;
   (b) receiving from the encoder N subband energy values $E_k$, where k varies from 1−N, each $E_k$ based on the energy present in a particular spectral subband of the original input signal;
   (c) providing N noise/waveform fill signals, each having an energy value $E'_k$, where the $E'_k$ is provided by the following steps:
      ($c_1$) computing values A, B which minimize $$\sum_{k=1}^{N} [E_k - (Ak + B)]^2;$$

($c_2$) computing N values $Z_k$ based on $E_k - (Ak+B)$, where k varies from 1−N;
   ($c_3$) identifying the largest $Z_k$ ($Z_k|_{max}$);
   ($c_4$) computing N values $E'_k$ based on $E_k - \xi(Z_k|_{max} - Z_k)$, where k varies from 1−N and $\xi$ is a predetermined constant;
   (d) combining the noise/waveform fill signals with said partially reconstructed signal.

2. The method of claim 1 wherein $\xi$ is generally =0.3.

3. The method of claim 1 wherein N=11.

4. A subband coding system including an encoder having an input signal and a decoder, said decoder having means for providing an improved reconstructed signal, comprising:
   means for providing a partially reconstructed signal based on information received from the encoder;
   means for receiving from the encoder N subband energy values $E_k$, where k varies from 1−N, each $E_k$ based on the energy present in a particular spectral subband of the original input signal;
   means for providing N noise/waveform fill signals, each having an energy value $E'_k$, including means for providing the $E'_k$, comprising:
   means for computing values A, B which minimize $$\sum_{k=1}^{N} [E_k - (Ak + B)]^2;$$

means for computing N values $Z_k$ based on $E_k - (Ak+B)$, where k varies from 1−N;
   means for identifying the largest $Z_k$ ($Z_k|_{max}$);
   means for computing N values $E'_k$ based on $E_k - \xi(Z_k|_{max} - Z_k)$, where k varies from 1−N and $\xi$ is a predetermined constant;
   means for combining the noise/waveform fill signals with said partially reconstructed signal.

5. The subband coding system of claim 4 wherein $\xi$ is generally =0.3.

6. The subband coding system of claim 4 wherein N=11.

7. A subband coding system including an encoder having an input signal and a decoder, said decoder being arranged for providing an improved reconstructed signal according to the method comprising the following steps:
   (a) providing a partially reconstructed signal based on information received from the encoder;
   (b) receiving from the encoder N subband energy values $E_k$, where k varies from 1−N, each $E_k$ based on the energy present in a particular spectral subband of the original input signal;
   (c) providing N noise/waveform fill signals, each having an energy value $E'_k$, where the $E'_k$ is provided by the following steps:
      ($c_1$) computing values A, B which minimize $$\sum_{k=1}^{N} [E_k - (Ak + B)]^2;$$

(c$_2$) computing N values $Z_k$ based on $E_k - (Ak+B)$, where k varies from $1-N$;

(c$_3$) identifying the largest $Z_k$ ($Z_{k|max}$);

(c$_4$) computing N values $E'_k$ based on $E_k - \xi(Z_{k|max} - Z_k)$, where k varies from $1-N$ and $\xi$ is a predetermined constant;

(d) combining the noise/waveform fill signals with said partially reconstructed signal.

8. The subband coding system of claim 7 wherein $\xi$ is generally $=0.3$.

9. The subband coding system of claim 7 wherein $N=11$.

10. A subband coding system including an encoder having an input signal and a decoder, said decoder having a computing means such as a microprocessor or a digital signal processor programmed for providing an improved reconstructed signal according to the method comprising the following steps:

(a) providing a partially reconstructed signal based on information received from the encoder;

(b) receiving from the encoder N subband energy values $E_k$, where k varies from $1-N$, each $E_k$ based on the energy present in a particular spectral subband of the original input signal;

(c) providing N noise/waveform fill signals, each having an energy value $E'_k$, where the $E'_k$ is provided by the following steps:

(c$_1$) computing values A, B which minimize $$\sum_{k=1}^{N} [E_k - (Ak + B)]^2;$$

(c$_2$) computing N values $Z_k$ based on $E_k - (Ak+B)$, where k varies from $1-N$;

(c$_3$) identifying the largest $Z_k$ ($Z_{k|max}$);

(c$_4$) computing N values $E'_k$ based on $E_k - \xi(Z_{k|max} - Z_k)$, where k varies from $1-N$ and $\xi$ is a predetermined constant;

(d) combining the noise/waveform fill signals with said partially reconstructed signal.

11. The subband coding system of claim 10 wherein $\xi$ is generally $=0.3$.

12. The subband coding system of claim 10 wherein $N=11$.

13. In a subband coding system including an encoder having an input signal and a decoder, a method for operating a computer such as a microprocessor or a digital signal processor for providing an improved reconstructed signal at the decoder, the method comprising the following steps:

(a) providing a partially reconstructed signal based on information received from the encoder;

(b) receiving from the encoder N subband energy values $E_k$, where k varies from $1-N$, each $E_k$ based on the energy present in a particular spectral subband of the original input signal;

(c) providing N noise/waveform fill signals, each having an energy value $E'_k$, where the $E'_k$ is provided by the following steps;

(c$_1$) computing values A, B which minimize $$\sum_{k=1}^{N} [E_k - (Ak + B)]^2;$$

(c$_2$) computing N values $Z_k$ based on $E_k - (Ak+B)$, where k varies from $1-N$;

(c$_3$) identifying the largest $Z_k$ ($Z_{k|max}$);

(c$_4$) computing N values $E'_k$ based on $E_k - \xi(Z_{k|max} - Z_k)$, where k varies from $1-N$ and $\xi$ is a predetermined constant;

(d) combining the noise/waveform fill signals with said partially reconstructed signal.

14. The method of claim 13 wherein $\xi$ is generally $=0.3$.

15. The method of claim 13 wherein $N=1$.

* * * * *

UNITED STATES PATENT AND TRADEMARK OFFICE
CERTIFICATE OF CORRECTION

PATENT NO. : 5,054,075
DATED      : October 1, 1991
INVENTOR(S) : Daehyoung Hong and Michael D. Kotzin It is certified that error appears in the above-identified patent and that said Letters Patent is hereby corrected as shown below:

At column 8, line 40, "N=1" should be --N=11--.

Signed and Sealed this

Twenty-fifth Day of May, 1993

Attest:

MICHAEL K. KIRK

Attesting Officer

Acting Commissioner of Patents and Trademarks